US009582497B2

(12) United States Patent
Beskrovny et al.

(10) Patent No.: US 9,582,497 B2
(45) Date of Patent: Feb. 28, 2017

(54) PROVIDING CONTEXT IN FUNCTIONAL TESTING OF WEB SERVICES

(71) Applicant: International Business Machines Corporation, Armonk, NY (US)

(72) Inventors: Evgeny Beskrovny, Ramat Gan (IL); Omer Tripp, Bronx, NY (US); Emmanuel Wurth, Muret (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/759,488

(22) PCT Filed: Jan. 23, 2014

(86) PCT No.: PCT/IB2014/058489
§ 371 (c)(1),
(2) Date: Jul. 7, 2015

(87) PCT Pub. No.: WO2014/128572
PCT Pub. Date: Aug. 28, 2014

(65) Prior Publication Data
US 2016/0012039 A1    Jan. 14, 2016

(30) Foreign Application Priority Data

Feb. 20, 2013  (GB) .................................. 1302971.5

(51) Int. Cl.
*G06F 11/00*    (2006.01)
*G06F 17/27*    (2006.01)
(Continued)

(52) U.S. Cl.
CPC ...... *G06F 17/2785* (2013.01); *G06F 11/3684* (2013.01); *G06F 17/3089* (2013.01); *G06F 17/30867* (2013.01)

(58) Field of Classification Search
CPC ............ G06F 11/2294; G06F 11/3672; G06F 11/3684; G06F 17/2785; G06F 17/30867; G06F 17/3089
See application file for complete search history.

(56) References Cited

U.S. PATENT DOCUMENTS 7,849,448 B2    12/2010 Yunus et al.
2002/0059039 A1    5/2002 Friedman et al.
(Continued)

FOREIGN PATENT DOCUMENTS

GB    2511047 A    8/2014
WO    2005082072 A2    9/2005
(Continued)

OTHER PUBLICATIONS

International Search Report and Written Opinion (PCT), International Application No. PCT/IB2014/058489, Mailing date: May 16, 2014, pp. 1-15.
(Continued)

*Primary Examiner* — Joshua P Lottich
(74) *Attorney, Agent, or Firm* — Stosch Sabo

(57) ABSTRACT

Providing context in functional testing of web services. Methods of a web service are categorized into predefined categories defining interaction flows on the web, based on a semantic analysis of the names of the web methods. For each categorized web method, a testing context for the web method is created according to its category in the form of a sequence of one or more other methods of the web service that provide an appropriate context for testing the web method.

19 Claims, 6 Drawing Sheets

(51) Int. Cl.
*G06F 11/36* (2006.01)
*G06F 17/30* (2006.01)

(56) References Cited

U.S. PATENT DOCUMENTS

| | | |
|---|---|---|
| 2005/0257198 A1 | 11/2005 | Stienhans et al. |
| 2007/0074167 A1 | 3/2007 | Cohrs et al. |
| 2007/0136236 A1* | 6/2007 | Kussmaul ............ G06F 17/3089 |
| 2008/0289012 A1 | 11/2008 | Shi et al. |
| 2009/0037881 A1 | 2/2009 | Christy et al. |
| 2009/0319832 A1 | 12/2009 | Zhang et al. |
| 2009/0319833 A1 | 12/2009 | Nir-Buchbinder et al. |
| 2011/0179007 A1* | 7/2011 | Shi ..................... G06F 17/3089 |
| | | 707/706 |

FOREIGN PATENT DOCUMENTS

| | | |
|---|---|---|
| WO | 2012019639 A1 | 2/2012 |
| WO | 2014128572 A1 | 8/2014 |

OTHER PUBLICATIONS

Search Report (United Kingdom), Application No. GB1302971.5, Dated Sep. 12, 2013, pp. 1-3.
Miao et al., "A Formal Specification-based Testing Approach to Accurate Web Service Selection," Services Computing Conference (APSCC), 2011, IEEE, pp. 259-266.
Makedonov, "Functional Testing of Web Services," 2004 International Quality Conference, Toronto, Ontario, Canada, Sep. 22, 2004, pp. 1-12.
Grant et al., "Contextualized Semantic Analysis of Web Services," Web Systems Evolution (WSE), 2011 13th IEEE International Symposium, Sep. 30, 2011, pp. 33-42.

* cited by examiner

PROVIDING CONTEXT IN FUNCTIONAL TESTING OF WEB SERVICES

BACKGROUND

This invention relates to the field of functional testing of web services. In particular, the invention relates to providing context in functional testing of web services.

Web services are a fundamental cornerstone of the web, providing online functionality for web applications as well as other web services. As such, web services have become an important subject of functional testing, including security testing, typestate checking, etc.

An important challenge in testing web services is to ensure that the test payload reaches the business logic of the web service. Otherwise, if the payload is invalid, then the web method typically reports a SOAP (Simple Object Access Protocol) fault, and there is little gain from submitting the payload.

One of the most prevalent reasons for the rejection of an input by a web method is if the method is invoked outside its appropriate context. For example, for a "DeleteCustomer" method to process its input data, this method must be called after a corresponding call to "CreateCustomer".

Existing testing tools for web services do not support this context problem. The strategy used to decide the order of invocation of web methods is largely arbitrary, for example, invoking all the web methods in the web service's WSDL (Web Services Description Language) file in a serial order.

This leads to many situations where testing misses important problems (for example, critical security vulnerabilities) simply because a method was invoked without its preconditions being met, which leads to immediate rejection of the input data.

Therefore, there is a need in the art to address the aforementioned problems.

BRIEF SUMMARY

Embodiments of the present invention disclose a method, computer program product, and system for providing context in functional testing of web services. Methods of a web service are categorized into predefined categories defining interaction flows on the web, based on a semantic analysis of the names of the web methods. For each categorized web method, a testing context for the web method is created according to its category in the form of a sequence of one or more other methods of the web service that provide an appropriate context for testing the web method.

In one aspect of the invention, the predefined categories defining interaction flows on the web are the categories of "create", "retrieve", "update" and "delete" operations.

In another aspect of the invention, categorizing the web methods of the web service into predefined categories includes receiving a file that includes a plurality of web methods of the web service, grouping the web methods according to their suffixes, and semantically analyzing prefixes of each web method in a given suffix group to classify the prefixes in one of the predefined categories defining interaction flows on the web.

In another aspect of the invention, the sequence of methods is a sequence of methods in the same suffix group other than the web method for which the testing context is being created.

Another aspect of the invention further includes determining a confidence score for the classifying of each prefix, and filtering low confidence scores by removing the category for web methods having prefixes with low confidence scores.

In other aspects of the invention, if the categorization of a method is a "delete" category, method sequences are built of the form create-delete, create-update-delete, create-retrieve-delete, create-update-retrieve-delete, and create-retrieve-update-delete. If the categorization of a method is an "update" category, method sequences are built of the form create-update, create-retrieve-update. If the categorization of a method is a "retrieve" category, method sequences are built of the form create-retrieve, create-update-retrieve. If there is no classification of a method, a testing context is created by building random sequences of methods.

The described aspects of the invention provide the advantage of providing more efficient web services testing by providing a context for web methods.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components, for example, program modules, have not been described in detail so as not to obscure the present invention.

Methods and systems are provided for addressing the problem of creating an appropriate context for the invocation of a web method, such that testing of the subject method commences at an admissible context, which enables visiting the business logic governed by the method. The context is provided in the form of calls of methods prior to the test target.

Based on semantic analysis of method names, it is often possible to categorize them into the CRUD categories—Create, Retrieve, Update and Delete—which are the semantic categories defining the majority of interaction flows in the web.

More formally, a method is provided for the context problem, which inputs a WSDL file and outputs for each method M in a WSDL file, a set of sequences ending in M, where each sequence induces an appropriate context for testing of M. For example, "DeleteCustomer" is mapped {[CreateCustomer, UpdateCustomer, DeleteCustomer], [CreateCustomer, DeleteCustomer], . . . }).

Figure 1:
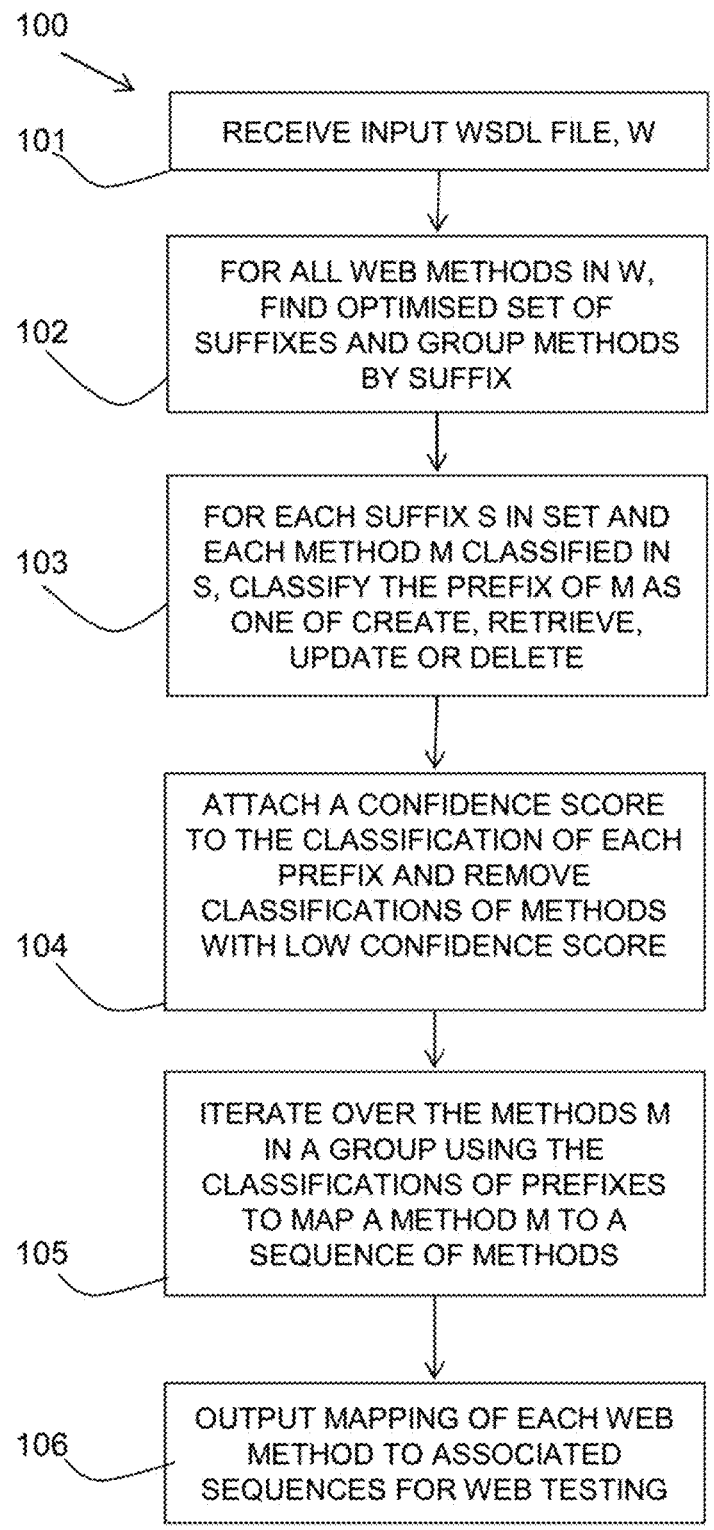
FIG. 1 is a flow diagram of an example embodiment of a method in accordance with the present invention.

Referring to FIG. 1, a flow diagram 100 shows an example embodiment of the described method.

An input file may be received (step 101) that concentrates the definition of the method of the web services, for example, a WSDL file, W. For all the web methods M in the WSDL file W, a set of suffixes may be found (step 102) that groups the methods M by suffix. The set of suffixes may optimize the solution for the following two constraints:
 a. The number of method groups is minimal; and
 b. For the group G for suffix S, the similarity between the suffix of each method in G and S is maximal.

For each suffix S in the set and each method M classified under suffix S, the prefix P of each method M may be considered (i.e., the part of M preceding its suffix that clusters as S) and semantic analysis may be used to classify (step 103) the prefix P as one of Create, Retrieve, Update or Delete.

In an alternative embodiment, semantic analysis may be carried out to categorize the methods into Create, Retrieve, Update or Delete operations without first grouping the methods by suffix.

A confidence score may be attached to the classification of a prefix P and, for each suffix S and group G of corresponding web methods, the classification may be removed (step 104) for all web methods whose confidence score is below some preset/dynamic threshold T. This filtering may alternatively be performed on-the-fly, as part of step 103, however, this may rule out certain kinds of dynamic thresholds. For example, a dynamic threshold may use an end user interaction where the threshold is proposed to the end user using a user interface pop-up for the methods discovered.

For each group G of methods M, the method may iterate (step 105) over the methods M using the classifications of prefixes to map a method to a sequence of methods.

For example, the following may apply:
 a. If the semantic classification of M is Delete, then build sequences of the form Create-Delete, Create-Update-Delete, Create-Retrieve-Delete, Create-Update-Retrieve-Delete, Create-Retrieve-Update-Delete for M, where the Create, Update and Retrieve offsets are filled with methods from G classified as Create, Update, Retrieve methods.
 b. If the semantic classification of M is Update, then build sequences of the form Create-Update, Create-Retrieve-Update for M (in an analogous way).
 c. If the semantic classification of M is Retrieve, then build sequences of the form Create-Retrieve, Create-Update-Retrieve for M (in an analogous way).
 d. If the semantic classification of M is Create, then the process knows that the context (pre-call of some methods) can be empty by design, when projected in a CRUD pattern, as this will be the starting method.
 e. For unclassified methods (due to step 104), build random sequences up to some length bound of a quantity limit for the permutations or total quantity of sequences expected.

If a method is not classified, a random context may be generated which may be based on identified methods or not. The results will be random and not as effective as contexts generated for classified methods.

The mapping of each web method to its associated sequences may be output (step 106) and used for web testing.

Figure 2:
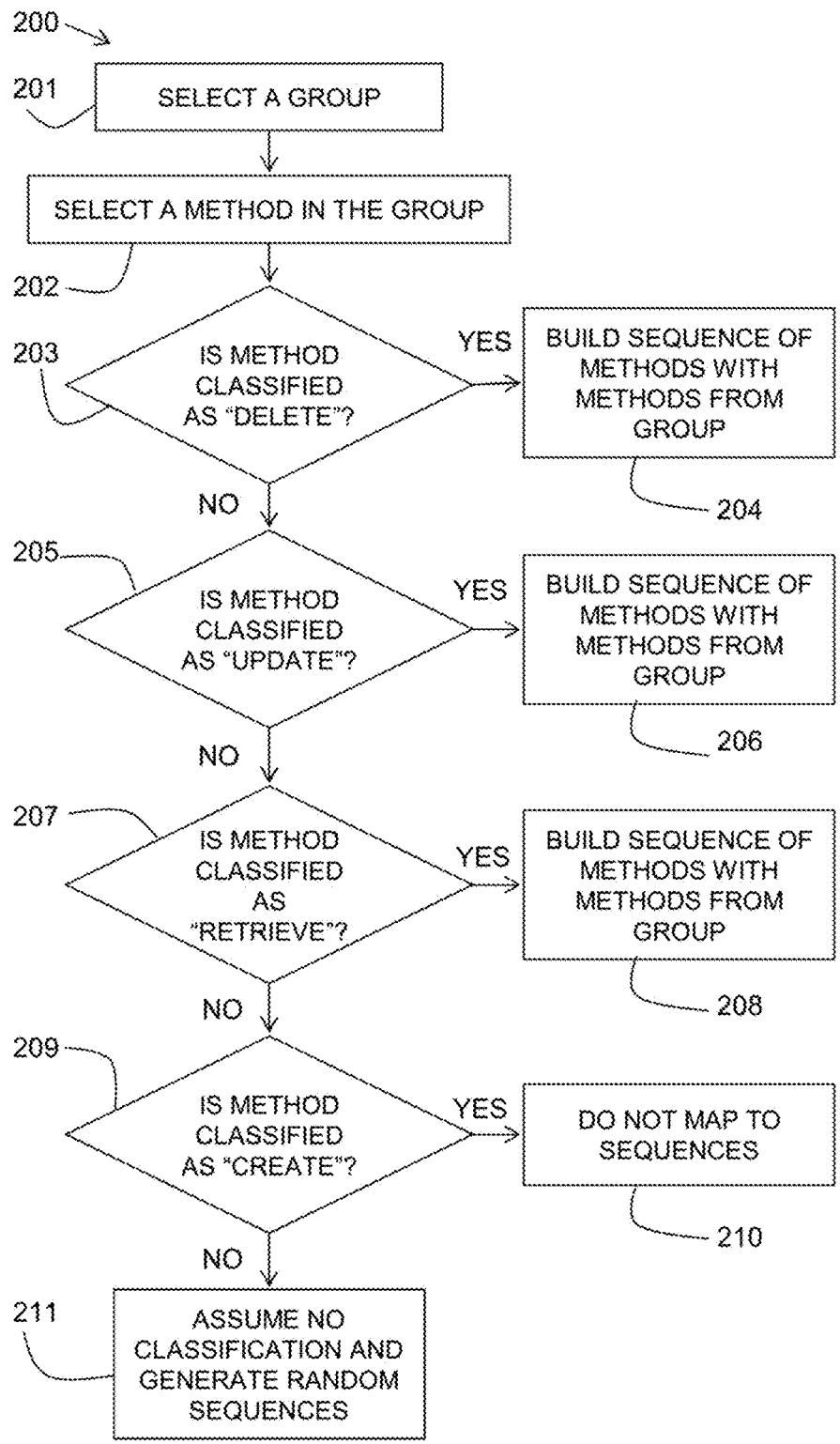
FIG. 2 is a flow diagram of an example embodiment of an aspect of a method in accordance with the present invention.

Referring to FIG. 2, a flow diagram 200 shows an example method for carrying out step 105 of FIG. 1.

A group may be selected (step 201). A first method in the group may be selected (step 202). It may be determined (step 203) if the method is classified as "Delete". If so, a sequence of methods may be built (step 204) as Create-Delete, Create-Update-Delete, Create-Retrieve-Delete, Create-Retrieve-Update-Delete, and Create-Update-Retrieve-Delete, with the Create, Update and Retrieve offsets being filled with methods from the group which are classified as Create, Update or Retrieve methods.

If it is determined (step 203) that the method is not classified as "Delete", the process may proceed to determine (step 205) if the method is classified as "Update". If so, a sequence of methods may be built (step 206) of the form Create-Update, Create-Retrieve-Update in an analogous way to step 204.

If it is determined (step 205) that the method is not classified as "Update", the process may proceed to determine (step 207) if the method is classified as "Retrieve". If so, a sequence of methods may be built (step 208) of the form Create-Retrieve, Create-Update-Retrieve, in an analogous way to step 204.

If it is determined (step 207) that the method is not classified as "Retrieve", the process may proceed to determine (step 209) if the method is classified as "Create". If so, the method may not be mapped (step 210) to any additional sequences.

If it is determined (step 209) that the method is not classified as "Create", then it may be assumed that there is no classification and random sequences may be generated (step 211).

Once all methods in a selected group have been processed, another group may be selected.

Figure 3A:
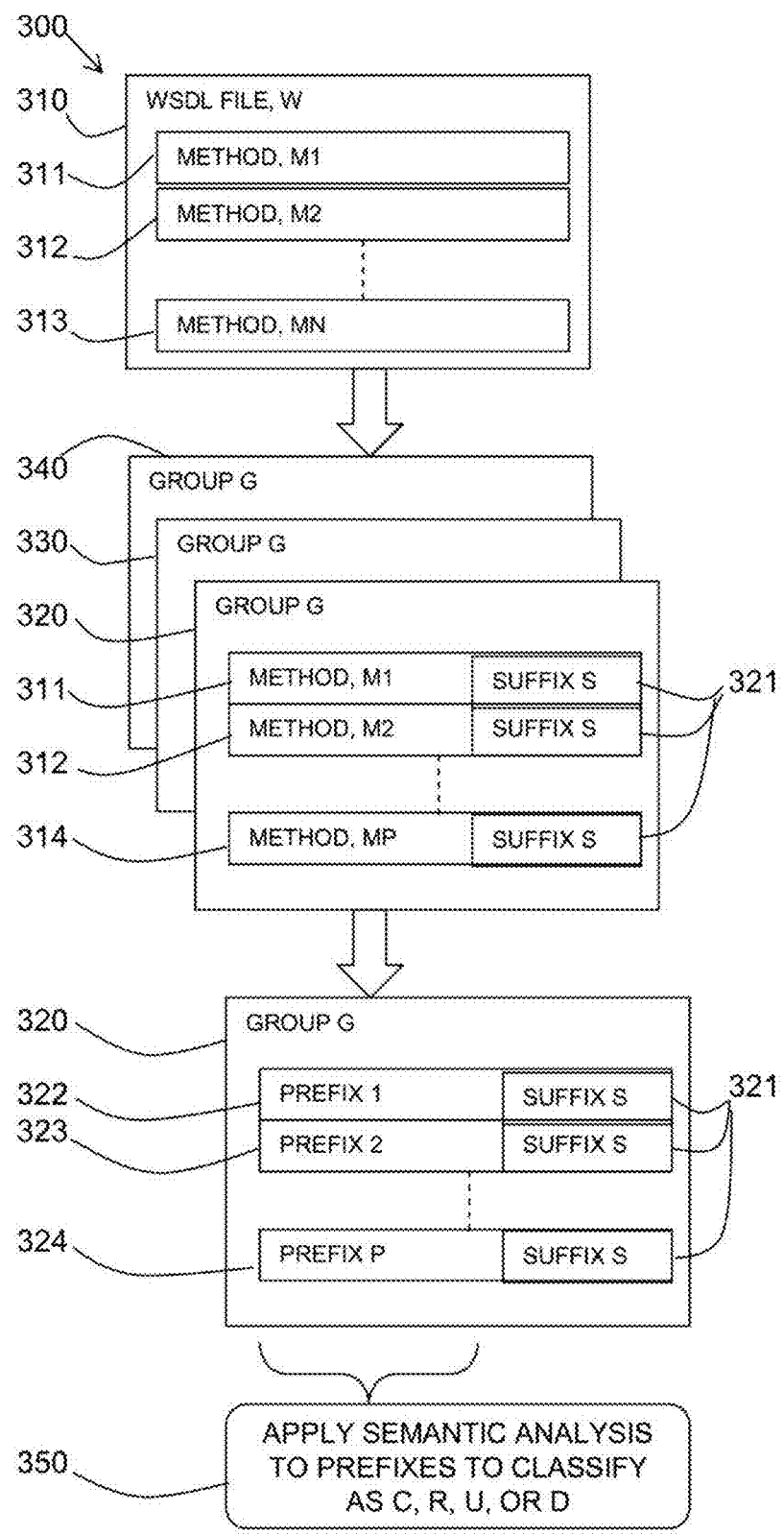
FIGS. 3A and 3B are schematic diagrams illustrating an embodiment of a method in accordance with the present invention.
Figure 3B:
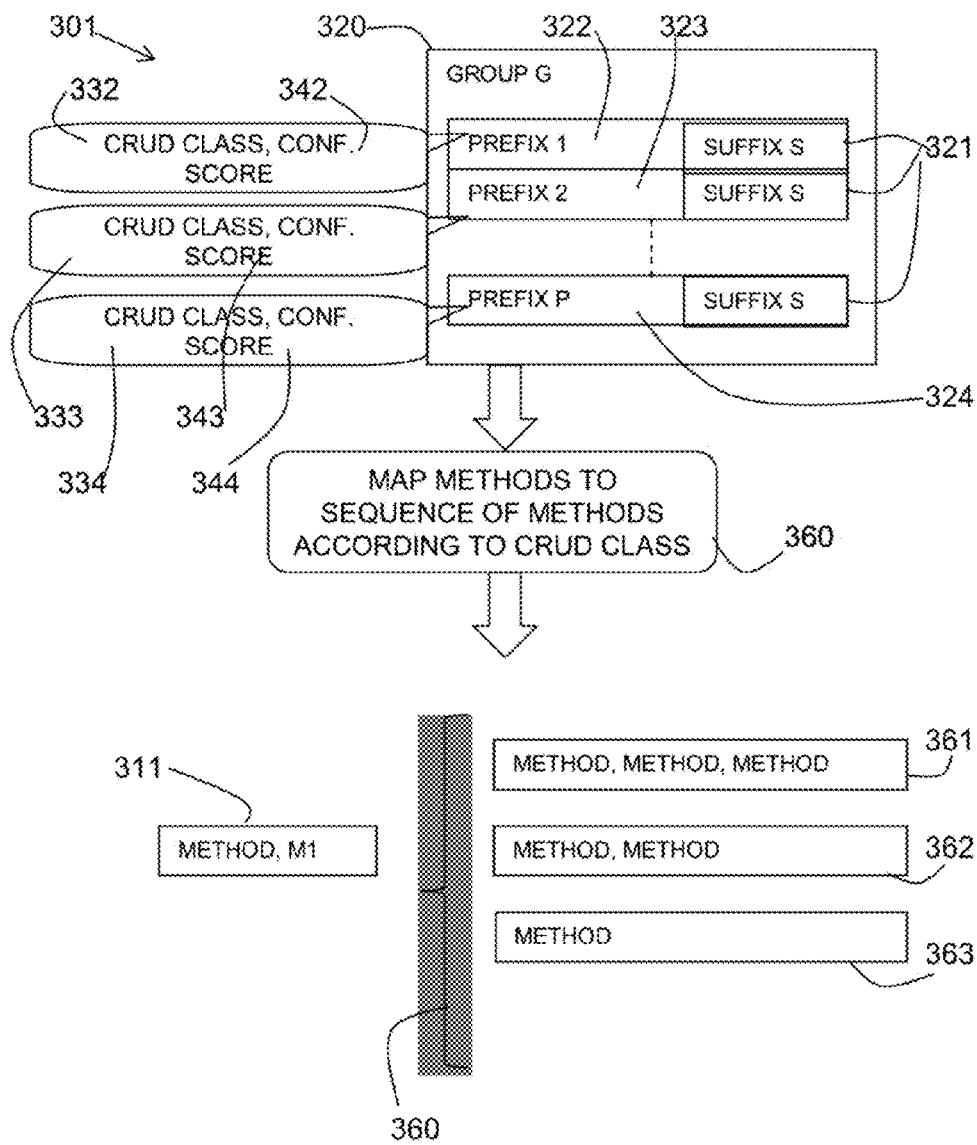

Referring to FIGS. 3A and 3B, schematic diagrams 300 and 301 illustrate the described method.

FIG. 3A shows a WSDL file, W, 310 including multiple web methods M1, M2 . . . Mn 311, 312, 313.

The methods 311-313 may be divided into groups 320, 330, 340 by suffix 321. For each suffix 321 the prefixes 322, 323, 324 of the methods 311, 312, 314 in the group 321 may be considered 350 to apply semantic analysis to classify the prefixes as Create, Retrieve, Update, or Delete (CRUD) actions.

FIG. 3B shows the results of the semantic analysis 350 with each prefix 322, 323, 324 having a CRUD class 332, 333, 334, and an associated confidence score 342, 343, 344. The methods of a group 320 may be mapped 360 to a sequence of methods of the group 320 according to the CRUD class.

This results in a method 311 mapping 360 to multiple series of methods 361, 362, 363 which set the context for the method 311.

The following are two real-world examples to which the described method may be applied.

The first, upcplus.asmx, exposes several CRUD groups, including:
 InsertUser, UpdateUser, DeleteUser,
 GetUsersGroup, UpdateUsersGroup, and InsertUserSoapIn, UpdateUserSoapIn, DeleteUserSoapIn.

The second, lundachark.asmx, exposes similarly related groups, such as:

RegisterSoap, SaveSoapIn, GetRegistrantSoapIn, and
RegisterSoap, SaveSoapOut, GetRegistrantSoapOut.

These can be classified into the CRUD taxonomy in a natural way, based on semantic analysis of the method prefixes and the proximity between their suffixes.

For example, in the first case of the upcpuls.asmx groups:
the prefix "Insert" may be classified into the CRUD taxonomy of "Create";
the prefix "Get" may be classified into the CRUD taxonomy of "Retrieve"; and
the prefixes of "Update" and "Delete" are the same as the CRUD taxonomies.

In the second case of the lundachark.asmx groups:
the prefixes "Register" and "Save" may be classified into the CRUD taxonomy of "Create"; and
the prefix "GetRegistrant" may be classified into the CRUD taxonomy of "Retrieve".

Figure 4:
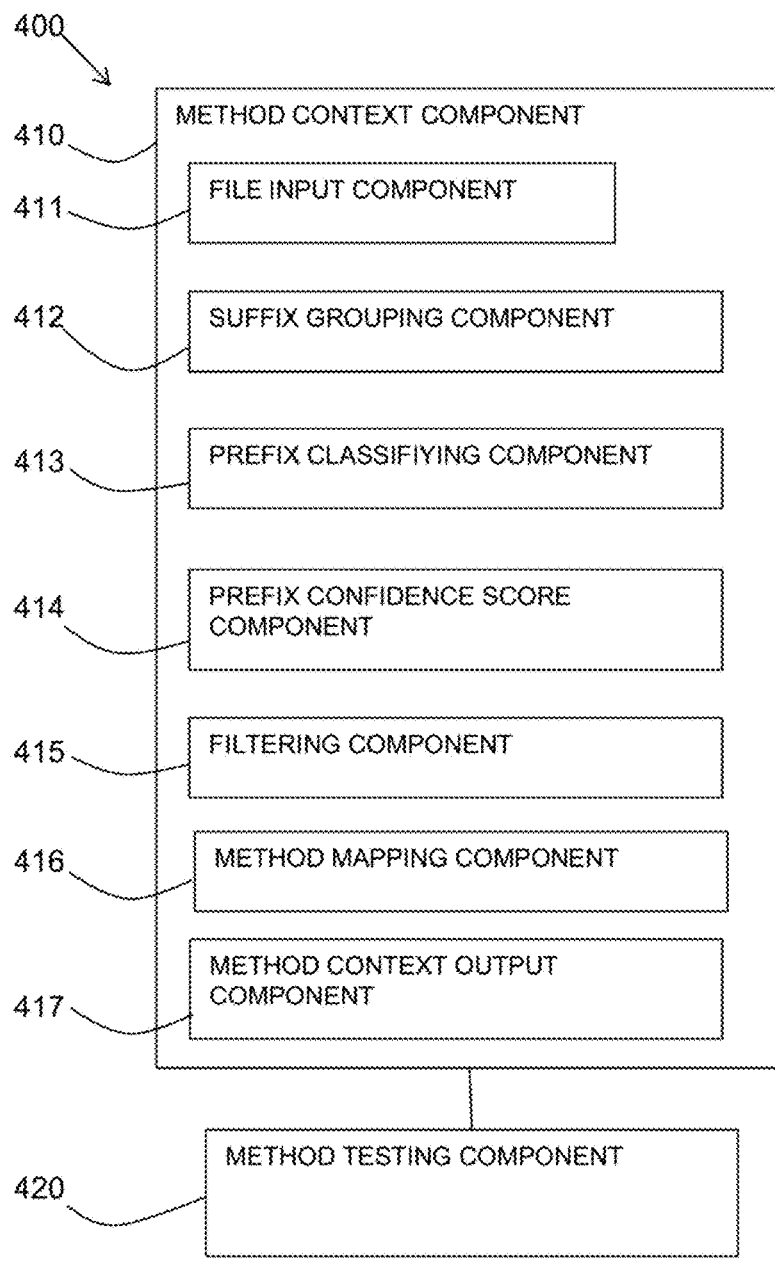
FIG. 4 is block diagram of an example embodiment of a system in accordance with the present invention.

Referring to FIG. 4, a block diagram shows an example embodiment of the described system 400, illustrating various components, for example, program modules, for implementing the embodiment.

A method context component 410 may be provided for inputting a file of web methods to be tested and outputting a mapping of each method to a sequence of methods that provide a correct context for testing by a method testing component 420.

The method context component 410 may include the following components.

A file input component 411 may be provided for receiving a file (for example, a WSDL file) of web methods.

A suffix grouping component 412 may be provided for grouping the methods of the input file by their suffix.

A prefix classifying component 413 may be provided for classifying each method in a suffix group by its prefix as one of Create, Retrieve, Update or Delete. The prefix classifying component 413 may include the use of semantic analysis of the prefixes.

A prefix confidence score component 414 may be provided for allocating a confidence score to the classification of the prefix by the prefix classifying component 413. This may be integral to the prefix classifying component 413 or separate to it. A filtering component 415 may use the confidence score to filter any untrustworthy prefix classifications.

A method mapping component 416 may be provided for using the classifications of the prefixes of methods in a group to map each method of a group to a sequence of methods from the group.

A method context output component 417 may be provided for outputting the method with its sequence mappings for testing by a method testing component 420.

Figure 5:
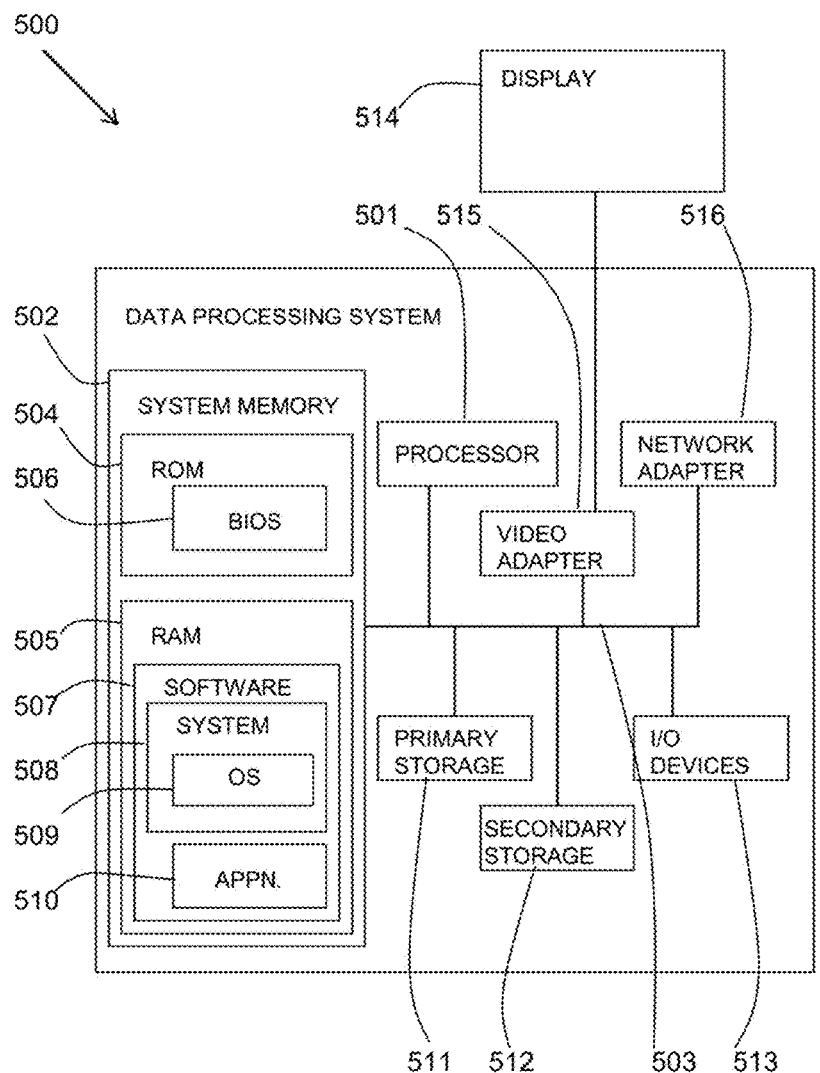
FIG. 5 is a block diagram of an embodiment of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated non-transitory computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable non-transitory medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for providing context in functional testing of web services, comprising:
categorizing methods of a web service into predefined categories defining interaction flows on the web, based on a semantic analysis of names of the web methods; and
for each categorized web method, creating a testing context for the web method according to its category in the form of a sequence of one or more other methods of the web service that provide an appropriate context for testing the web method.

2. The method as claimed in claim 1, wherein the predefined categories defining interaction flows on the web are the categories of "create", "retrieve", "update" and "delete" operations.

3. The method as claimed in claim 2, wherein categorizing web methods of a web service into predefined categories defining interaction flows on the web, based on a semantic analysis of the names of the web methods includes:
receiving a file that includes a plurality of web methods of the web service;
grouping the web methods according to their suffixes; and
semantically analyzing prefixes of each web method in a given suffix group to classify the prefixes in one of the predefined categories defining interaction flows on the web.

4. The method as claimed in claim 3, wherein grouping the methods according to their suffixes optimises a minimal number of groups with the similarity between suffixes of each method being maximal.

5. The method as claimed in claim 3, further comprising:
determining a confidence score for the classifying of each prefix; and
filtering low confidence scores by removing the category for web methods having prefixes with low confidence scores.

6. The method as claimed in claim 5, wherein if there is no classification of a method, creating a testing context by building random sequences of methods.

7. The method as claimed in claim 3, further comprising:
iterating over the plurality of web methods using the classification of the prefixes to map to a sequence of methods.

8. The method as claimed in claim 7, wherein the sequence of methods is a sequence of methods in the same suffix group other than the web method for which the testing context is being created.

9. The method as claimed in claim 8, further comprising:
if the categorization of a method is a "delete" category, building method sequences of the form create-delete, create-update-delete, create-retrieve-delete, create-update-retrieve-delete, and create-retrieve-update-delete, wherein the create, update, retrieve methods are filled with methods classified in these categories in a same suffix group.

10. The method as claimed in claim 8, further comprising:
if the categorization of a method is an "update" category, building method sequences of the form create-update, create-retrieve-update, wherein the create, retrieve methods are filled with methods classified in these categories in a same suffix group.

11. The method as claimed in claim 8, further comprising:
if the categorization of a method is a "retrieve" category, building method sequences of the form create-retrieve, create-update-retrieve, wherein the create, update methods are filled with methods classified in these categories in a same suffix group.

12. A system for providing context in functional testing of web services, comprising:
a memory and a processor configured to perform a method comprising:
using semantic analysis of method names to categorize them into predefined categories defining interaction flow on the web and creating an appropriate context for a web method according to its category in the form of a sequence of methods providing appropriate contexts for testing the web method.

13. The system of claim 12, wherein the predefined categories defining interaction flows on the web are the categories of "create," "retrieve," "update," or "delete" operations.

14. The system of claim 12, wherein the processor is configured to perform a method further comprising:
receiving a file having a plurality of methods;
grouping the methods according to their suffixes;
semantically analyzing the prefixes of each method in a given suffix group to classify the prefixes in one of the predefined categories defining interaction flow on the web.

15. The system of claim 14, wherein grouping the methods according to their suffixes optimizes a minimal number of groups with the similarity between suffixes of each method being maximal.

16. The system of claim 12, wherein the processor is configured to perform a method further comprising:
determining a confidence score for the classifying of each prefix; and
filtering low confidence scores by removing the category for methods having prefixes with low confidence scores.

17. The system of claim 12, wherein the processor is further configured to perform a method further comprising:
iterating over the input methods using the classification of the prefixes to map to a sequence of methods.

18. The system of claim 17, wherein the sequence of methods is a sequence of other methods in the same suffix group.

19. A computer program product for providing context in functional testing of web services, the computer program product comprising: a non-transitory computer readable storage medium readable by a processing circuit and storing instructions for execution by the processing circuit for performing a method, including:
categorizing methods of a web service into predefined categories defining interaction flows on the web, based on a semantic analysis of names of the web methods; and
for each categorized web method, creating a testing context for the web method according to its category in the form of a sequence of one or more other methods of the web service that provide an appropriate context for testing the web method.

* * * * *